United States Patent [19]

Pfenninger

[11] 4,285,707

[45] Aug. 25, 1981

[54] DUST SEPARATOR FOR SEPARATING DUST FROM FLOWING GASEOUS MEDIA

[75] Inventor: Hans Pfenninger, Baden, Switzerland

[73] Assignee: BBC Brown, Boveri & Company Limited, Baden, Switzerland

[21] Appl. No.: 96,332

[22] Filed: Nov. 21, 1979

[30] Foreign Application Priority Data

Dec. 1, 1978 [CH] Switzerland .................. 12297/78

[51] Int. Cl.³ .......................................... B01D 45/12
[52] U.S. Cl. ...................................... 55/396; 55/404; 55/406; 55/412; 55/459 B; 209/144; 55/457
[58] Field of Search .................... 55/261, 392–399, 55/430–432, 404–408, 447, 456, 457, 459 B, 412; 209/144

[56] References Cited

U.S. PATENT DOCUMENTS

| 710,626 | 10/1902 | Smith | 55/404 |
|---|---|---|---|
| 851,254 | 4/1907 | Rothenbucher | 55/405 |
| 1,870,216 | 8/1932 | Baldwin | 55/392 |
| 2,346,005 | 4/1944 | Bryson | 55/457 |
| 2,482,642 | 9/1949 | Sylvan | 55/408 |
| 2,512,401 | 6/1950 | Whittaker | 55/447 |
| 2,616,519 | 11/1952 | Crankshaw | 55/396 |
| 3,853,527 | 12/1974 | Andrews | 55/405 |
| 4,171,960 | 10/1979 | Jarvenpaa | 55/428 |

FOREIGN PATENT DOCUMENTS

| 821574 | 10/1959 | United Kingdom | 55/394 |
|---|---|---|---|
| 341506 | 7/1970 | U.S.S.R. | 55/404 |

*Primary Examiner*—Bernard Nozick
*Attorney, Agent, or Firm*—Burns, Doane, Swecker & Mathis

[57] ABSTRACT

Dust separator for the separation of even fine dust particles from a flowing gaseous media whereby a swirling action is imparted to the gas through which the coarse dust portion is centrifuged and a free-running turbine wheel is rotated so that the fine dust particles are likewise centrifuged in the blade ring of the turbine wheel.

2 Claims, 8 Drawing Figures

DUST SEPARATOR FOR SEPARATING DUST FROM FLOWING GASEOUS MEDIA

BACKGROUND AND OBJECTS OF THE INVENTION

The present invention concerns a dust separator for the separation of even fine dusts from flowing gaseous media.

Dust separators for gaseous media are especially important at places where a destruction of vital components can result, such as, for example, in coal dust-fired gas turbines, coal gasification plants, firings by means of fluidized bed combustion, etc.

For example, it is possible in coal gas-fired gas turbines that poor dust separation can result in the turbine blades of the first stages being destroyed by erosion even after only a few days of continuous operation.

For these reasons and also with respect to achieving as complete a separation as possible of industrial waste gases, which is required evermore urgently today for reasons of environmental protection, it is necessary to produce dust separators by means of which even the finest dust can be removed to a higher degree than in the case of the previous mechanically working separators.

The dust separators well known today have the disadvantage that their degree of separation drops severely as the particle size becomes smaller. Also, the pressure drop caused by the particles is relatively great and a great sweep-gas quantity is required for removal of the dust which involves a considerable energy loss when purifying combustion gases.

These disadvantages are avoided by the dust separator according to the presently claimed invention wherein a main flow conduit conducts the gaseous media. A swirling motion is imparted to the gaseous media within the main conduit. A freely-rotating turbine wheel is arranged at an outlet of the main conduit. The wheel includes blades on the periphery thereof which are acted upon by swirling air from the main conduit to rotate the turbine wheel. An outlet conduit is disposed downstream of said turbine wheel. An annular channel surrounds the turbine wheel. The channel communicates with the main conduit by means of a first gap situated between the outlet of the main conduit and the inlet of the turbine wheel, and communicates with the outlet conduit by means of a second gap situated between the outlet of the turbine wheel and an inlet of the outlet conduit.

THE DRAWINGS

Preferred embodiments of the invention are described in detail in the following description on the basis of the accompanying drawings in which.

DETAILED DESCRIPTION OF PREFERRED EMBODIMENTS OF THE INVENTION

Figures 1, 2:
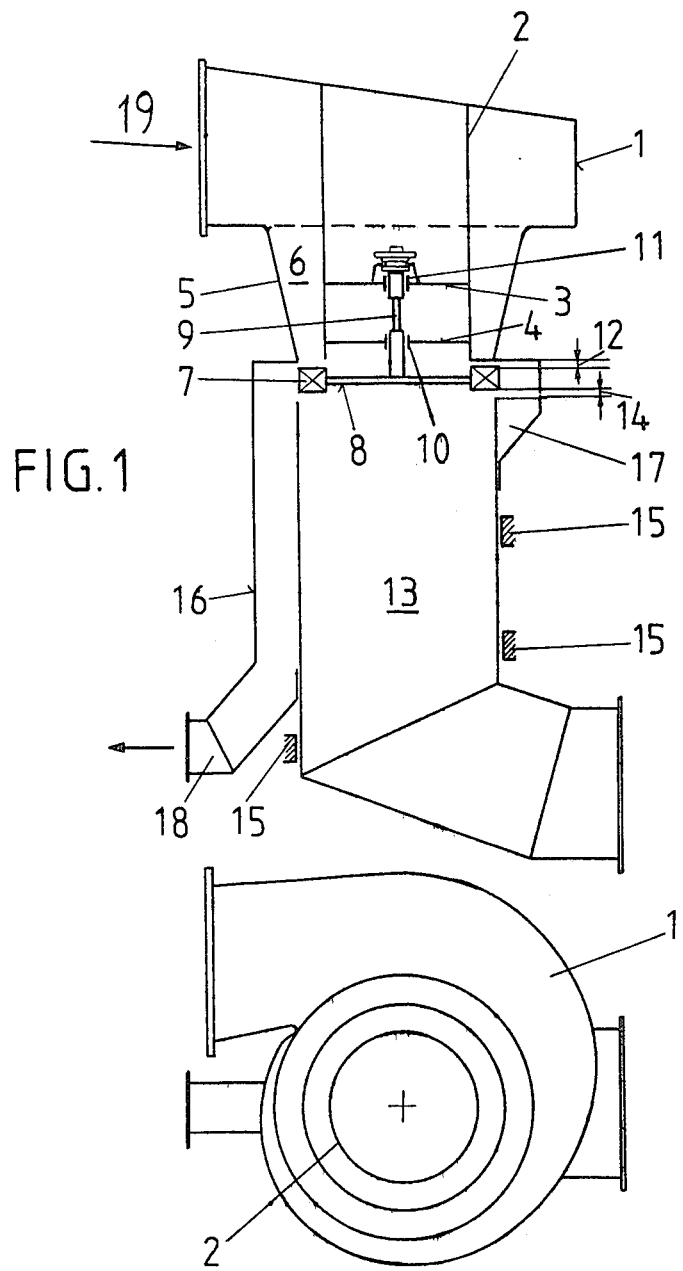
FIG. 1 depicts a dust separator according to the invention in longitudinal sectional view with a spiral housing serving as a spin producer.
FIG. 2 is a plan view of the separator depicted in FIG. 1.

In FIG. 1, member 1 is a spiral housing within which a circular-cylindrical casing 2 forms a frame for carrying two partitions 3 and 4. A conical casing portion 5 of the spiral housing 1 defines, together with the circular-cylindrical casing 2, a ring chamber or main conduit 6 tapering in the downward flow direction of the gas. Downstream of the outlet cross section of this ring chamber 6 is located a rotating blade ring 7 of a freely rotatable turbine wheel 8 whose shaft 9 is supported in bearings 11 and 10 mounted in the partitions 3 and 4, respectively. The lower bearing 10 is a radial bearing whereas the upper bearing 11 comprises a radial and axial bearing. By means of a hand wheel and a screw mechanism which is not shown, this upper bearing 11 can be shifted axially, together with the shaft 9, whereby the turbine wheel 7 can be raised. In this manner, the width of a gap 12 formed between the outlet plane of the ring chamber 6 and the inlet plane of turbine wheel 8 can be adjusted.

Downstream from the turbine wheel 8 is located a short outlet of connecting pipe 13 which is supported for axial adjustment for the purpose of adjusting the width of a gap 14 formed between the outlet plane of the turbine wheel 8 and the upper edge of the short connecting pipe 13.

The upper end of the short connecting pipe 13 is enclosed by a dust collector 16 which forms an annular ring chamber 17 around the turbine wheel 8 and which is in communication with the inside of the short connecting pipe 13 through the gap 14. The lower portion of the dust collector 16 forms an incline along which the separated dust trickles down into the escape pipe 18.

Dust-charged gas 19 which enters the spiral housing 1 is set in rotation by the spiral shape of the housing whereby the coarser dust particles are centrifuged and migrate downwardly in ring chamber 6 and travel through the upper gap 12 into the ring chamber 17 of the dust collector 16. The fine dust particles which, according to the invention, are not centrifuged by the spin in the ring chamber, travel into the zone of the rotating blade ring 7 of the free-running turbine wheel 8 which is set in rotation by the swirling motion of the glas flow. Accordingly, even the finest dust particles are centrifuged by the bent blades of the rotating blade ring 7 and are discharged with little sweep gas into the ring chamber 17 of the dust collector 16. The gas purified in this manner passes through the short connecting pipe 13 to the user.

As already mentioned, the widths of gaps 12 and 14 may be varied by devices for axially shifting of the shaft 9 of turbine wheel or the short connecting pipe 13, respectively, so that the optimum slot widths can be adjusted for each size of dust separator and for the actual dust quality in order to obtain the best possible separation efficiency.

Figure 3:
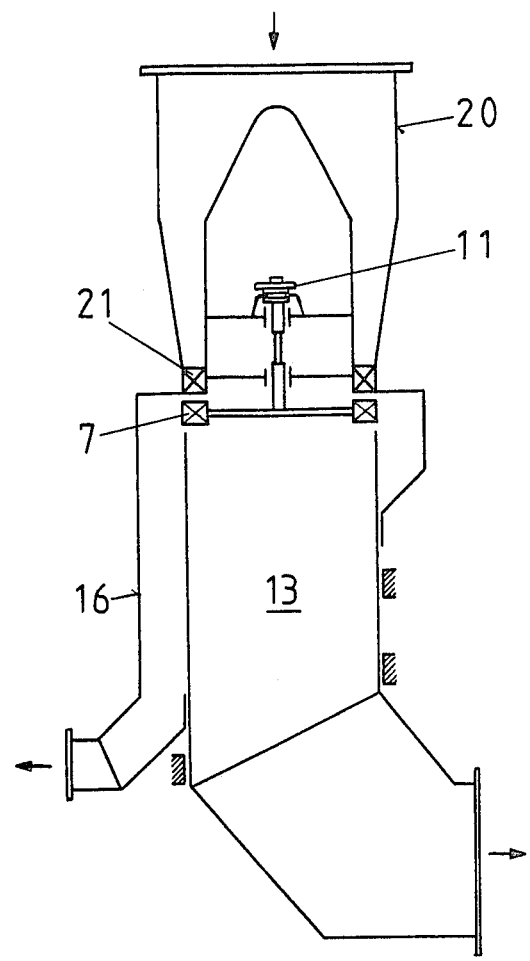
FIG. 3 is a modified form of separator employing a rotating blade ring as a spin producer.
Figure 4:
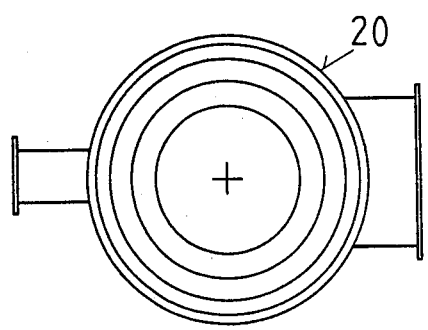
FIG. 4 is a plan view of the separator depicted in FIG. 3.
Figure 6:
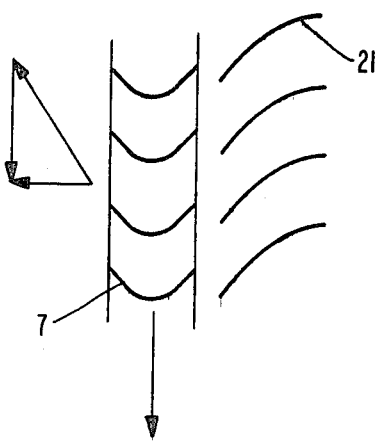
FIG. 6 is an enlargement depicting schematically the relationship between the fixed blade and rotating blade ring of the embodiment according to FIG. 5.

In the embodiment according to FIG. 3, the gas to be purified enters a symmetrically constructed inlet pipe or main conduit 20 parallel to the pipe axis, and is set in rotation by a fixed blade ring 21 provided at its outlet (see FIG. 6).

With the construction according to FIG. 3, the gas to be purified flows axially into a rotationally symmetric inlet pipe 20 having a fixed blade ring 21 provided at its outlet. In accordance with classical laws of fluid mechanics and conventional operation of turbomachinery blading, this blade ring 21 establishes a tangential velocity component in the gas discharged from the blade ring. Accordingly, the larger particles are acted upon by centrifugal force and pass through the gap 12 in the same manner as in the embodiment described in accordance with FIG. 1. The remaining construction of the FIG. 3 embodiment corresponds to that of FIG. 1.

Figure 5:
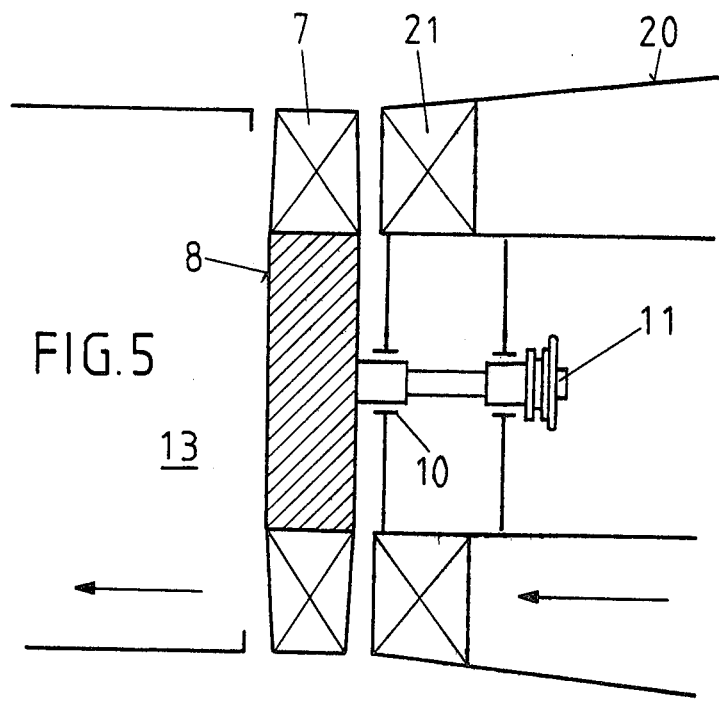
FIG. 5 is an enlarged longitudinal sectional view through the rotating blade ring and rotor wheel of the embodiment according to FIG. 2.

FIG. 5 shows in a large scale the fixed blade ring and turbine wheel of the construction according to FIG. 3. FIG. 6 shows a section through the fixed and rotating blading as well as a velocity vector diagram for the gas flow. The stationary blades 21 direct gas generally tangentially relative to the blade ring 7. The blading is suitable constructed such that the outlet from the rotating blade ring is essentially swirl-free in order to keep as small as possible the pressure losses.

Figure 7:
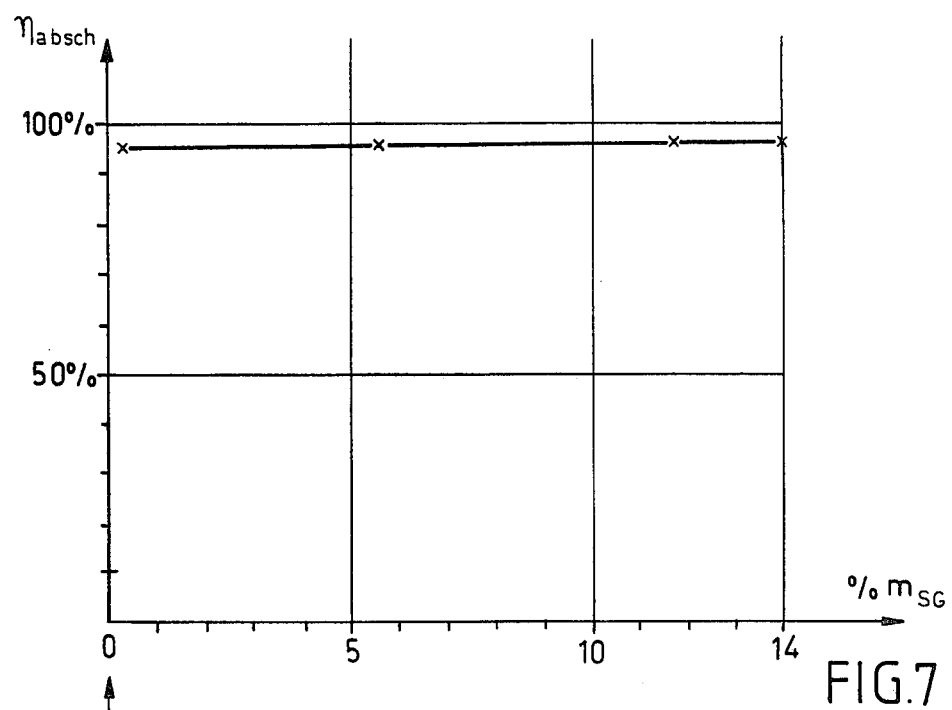
FIG. 7 is a diagram showing the separation efficiency of the present invention as a function of the sweep-gas quantity.

The diagram according to FIG. 7 shows separation efficiency as a function of the sweep-gas quantity $m_{SG}$ carried along with the separated dust. The latter quantity is stated in percent of gas throughput. It can be seen that the efficiency of the separation is practically indepedent of the sweep gas quantity so that the dust can be discharged with a very small sweep gas quantity. For example, there is obtained with a sweep gas quantity of 0.3% a practically equally good separation efficiency as with 14% sweep gas.

Figure 8:
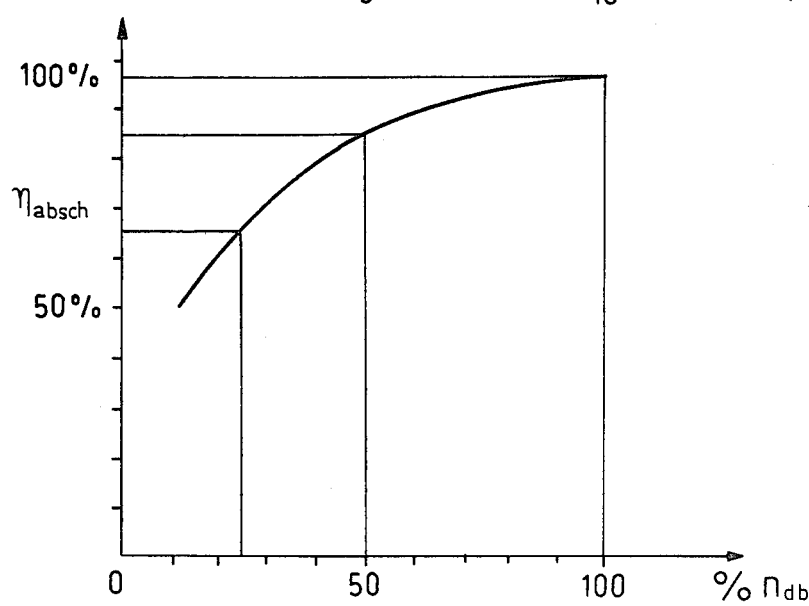
FIG. 8 is a diagram showing the separation efficiency as a function of the run away speed of the turbine wheel.

It becomes clear from the diagram of FIG. 8 that the efficiency of separation significantly worsens if the turbine wheel 8 is braked, i.e., runs under the run away speed $n_{db}$. At one half of that rotational speed, the separation efficiency amounts only to 85% and at one quarter of that rotational speed, only to 65%.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A dust separator for separting particles from a flowing gaseous media, said separator comprising:

a main flow conduit for conducting the gaseous media;

means for imparting a swirling motion to the gaseous media within said main conduit;

a freely-rotating turbine wheel arranged at an outlet of said main conduit, said wheel including blades on the periphery thereof which are acted upon by gaseous media from said main conduit to rotate the turbine wheel;

an outlet conduit disposed downstream of said turbine wheel; and an annular channel surrounding said turbine wheel blades, said channel communicating with said main conduit by means of a first gap situated between the outlet of said main conduit and the inlet of said turbine sheel blades, and communicating with said outlet conduit by means of a second gap situated between the outlet of said turbine wheel blades and an inlet of said outlet conduit;

the area between the outlet of said turbine blades and the inlet of said outlet conduit being unobstructed to enable gaseous media exiting said blades to travel directly into said outlet conduit;

said turbine wheel being mounted in an adjustable bearing defining means for adjusting said first gap, said outlet conduit being movable to enable said second gap to be adjusted.

2. A dust separator for separating particles from a flowing gaseous media, said separator comprising:

a main flow conduit for conducting the gaseous media, means for imparting a swirling motion to the gaseous media within said main conduit;

a freely-rotating turbine wheel arranged at an outlet of said main conduit, said wheel including blades on the periphery thereof which are acted upon by air from said main conduit to rotate the turbine wheel;

an outlet conduit disposed downstream of said turbine wheel; and an annular channel surrounding said turbine wheel, said channel communicating with said main conduit by means of a first gap situated between the outlet of said main conduit and the inlet of said turbine wheel, and communicating with said outlet conduit by means of a second gap situated between the outlet of said turbine wheel and an inlet of said outlet conduit;

said turbine wheel being mounted in an adjustable bearing defining means for adjusting said first gap, said outlet conduit being movable to enable said second gap to be adjusted.

* * * * *